United States Patent
Masuzaki et al.

(10) Patent No.: US 11,093,314 B2
(45) Date of Patent: Aug. 17, 2021

(54) TIME-SEQUENTIAL DATA DIAGNOSIS DEVICE, ADDITIONAL LEARNING METHOD, AND RECORDING MEDIUM

(71) Applicant: Mitsubishi Electric Corporation, Tokyo (JP)

(72) Inventors: Takahiko Masuzaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/734,229

(22) PCT Filed: Jul. 23, 2018

(86) PCT No.: PCT/JP2018/027441
§ 371 (c)(1),
(2) Date: Dec. 2, 2020

(87) PCT Pub. No.: WO2020/021587
PCT Pub. Date: Jan. 30, 2020

(65) Prior Publication Data
US 2021/0216386 A1 Jul. 15, 2021

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/076* (2013.01); *G06F 11/0775* (2013.01); *G06F 16/22* (2019.01); *G06N 20/00* (2019.01)

(58) Field of Classification Search
CPC ...... G06F 11/079; G06F 11/076; G06F 16/22; G06F 11/0775; G06N 20/00
(Continued)

(56) References Cited

U.S. PATENT DOCUMENTS

2013/0218522 A1* 8/2013 Suzuki ............... G05B 23/0208
702/183
2016/0169771 A1* 6/2016 Hiruta ............... G05B 23/0243
702/183
(Continued)

FOREIGN PATENT DOCUMENTS

JP 2009-146086 A 7/2009
JP 2012-252556 A 12/2012
(Continued)

OTHER PUBLICATIONS

International Search Report and Written Opinion dated Oct. 9, 2018, received for PCT Application No. PCT/JP2018/027441, filed on Jul. 23, 2018, 8 pages including English Translation of the Search report.
(Continued)

*Primary Examiner* — Albert Decady
*Assistant Examiner* — Osman M Alshack
(74) *Attorney, Agent, or Firm* — Xsensus LLP

(57) ABSTRACT

The time-series data diagnosis device includes a storage, a difference-degree calculator, a diagnosis-result-information generator, an evaluation information acquirer, and an updater. The difference-degree calculator calculates a difference degree between diagnosis target time-series data and a learned-sample subsequence data item stored in the storage. The diagnosis-result-information generator generates, based on the difference degree calculated by the difference-degree calculator, diagnosis result information about the diagnosis target time-series data. The evaluation information acquirer acquires evaluation information indicating evaluation as to whether a diagnosis result indicated by the diagnosis result information is valid. The updater, when the evaluation information acquired by the evaluation information acquirer indicates evaluation that the diagnosis result is not valid, updates, based on the diagnosis target time-series
(Continued)

data corresponding to the diagnosis result information, the learned-sample subsequence data item stored in the storage.

12 Claims, 7 Drawing Sheets

(51) Int. Cl.
*G06N 20/00* (2019.01)
*G06F 16/22* (2019.01)

(58) Field of Classification Search
USPC .................................................. 714/25, 37
See application file for complete search history.

(56) References Cited

U.S. PATENT DOCUMENTS

| | | | |
|---|---|---|---|
| 2016/0217398 A1* | 7/2016 | Unuma | G06Q 50/30 |
| 2017/0242076 A1* | 8/2017 | Yoshiura | G01R 31/346 |
| 2018/0217812 A1* | 8/2018 | Nakamura | G06F 16/903 |
| 2018/0349320 A1* | 12/2018 | Yamaguchi | G06F 17/16 |
| 2019/0310927 A1* | 10/2019 | Masuzaki | G06F 11/0751 |
| 2020/0257686 A1* | 8/2020 | Law | G06F 16/248 |

FOREIGN PATENT DOCUMENTS

| | | |
|---|---|---|
| JP | 2015-88078 A | 5/2015 |
| JP | 2015-108886 A | 6/2015 |
| JP | 2016-33778 A | 3/2016 |
| JP | 2017-151598 A | 8/2017 |
| WO | 2014/207789 A1 | 12/2014 |
| WO | 2016/117086 A1 | 7/2016 |

OTHER PUBLICATIONS

Notice of Reasons for Refusal received for Japanese Patent Application No. 2019-526332, dated Aug. 27, 2019, 8 pages including English Translation.

Decision to Grant a Patent received for Japanese Patent Application No. 2019-526332, dated Jan. 14, 2020, 5 pages including English Translation.

Hirai et al., "Data Analysis Technologies for Maintenance and Management of Facilities", Mitsubishi Denki Giho. vol. 90, No. 7, Jul. 20, 2016, pp. 40-44 (9 pages including English Abstract).

* cited by examiner

TIME-SEQUENTIAL DATA DIAGNOSIS DEVICE, ADDITIONAL LEARNING METHOD, AND RECORDING MEDIUM

CROSS-REFERENCE TO RELATED APPLICATION

The present application is based on PCT filing PCT/JP2018/027441, filed Jul. 23, 2018, the entire contents of which are incorporated herein by reference.

TECHNICAL FIELD

The present disclosure relates to a time-series data diagnosis device, an additional learning method, and a recording medium.

BACKGROUND ART

Various types of data obtained as time passes are accumulated in a facility such as a building or a factory, a device installed in a line of a factory, an automobile, a railway vehicle, or the like. Apparatuses are being researched that diagnose such data to detect an abnormality in a device. Further, research is also conducted to improve diagnostic accuracy by causing such an apparatus to learn time-series data during normal or abnormal operation. For example, Patent Literature 1 discloses a technique for generating, based on statistical values of subsequence data items that are mutually similar among subsequence data extracted from time-series data, sample subsequence data as a learned model serving as a comparison target in the performance of diagnosis. Employing the generated sample subsequence data as comparison targets in performing the diagnosis achieves a balance between diagnostic accuracy and a calculation amount.

CITATION LIST

Patent Literature

Patent Literature 1: International Publication No. WO 2016/117086
Patent Literature 2: Unexamined Japanese Patent Application Publication No. 2016-033778

SUMMARY OF INVENTION

Technical Problem

High accuracy from the start is desirable in the generation of the sample subsequence data that serve as the learned model. However, due to time requirements or economical requirements, complete accuracy from the start cannot always be achieved. Further, various types of changes in operating conditions, such as deterioration over time of a device and seasonal changes, should be addressed. Thus updating the sample subsequence data by performing additional learning even during operation is desirable, although Patent literature 1 does not disclose a method for performing, during operation, additional learning to update the learned model. Conversely, Patent literature 2 discloses a technique for adding time-series data diagnosed by diagnosis means as having no signs of damage to a cluster of a time slot to which the time-series data belongs and updating the cluster. However, the technique disclosed in Patent literature 2 is a technique for updating the cluster based on the added time-series data and a plurality of time-series data that are members of the cluster before addition of the added time-series data, resulting in a large amount of calculation. Thus such configuration cannot be said to be appropriate for additional learning during operation requiring speedy processing. Further, simply lowering the calculation amount remarkably lowers the accuracy of learning and is not robust enough for practical use.

The present disclosure is made in view of the aforementioned circumstances, and an objective of the present disclosure is to provide a time-series data diagnosis device, an additional learning method, and a program that enable additional learning with a small calculation amount and high accuracy.

Solution to Problem

To achieve the aforementioned objective, a time-series data diagnosis device according to the present disclosure includes storage means, difference-degree calculation means, diagnosis-result-information generation means, evaluation information acquisition means, and updating means. The storage means stores a learned-sample subsequence data item generated based on learning target time-series data. The difference-degree calculation means calculates a difference degree between diagnosis target time-series data and the learned-sample subsequence data item stored in the storage means. The diagnosis-result-information generation means generates, based on the difference degree calculated by the difference-degree calculation means, diagnosis result information about the diagnosis target time-series data. The evaluation information acquisition means acquires evaluation information indicating evaluation as to whether a diagnosis result indicated by the diagnosis result information is valid. The update means, when the evaluation information acquired by the evaluation information acquisition means indicates evaluation that the diagnosis result is not valid, updates, based on the diagnosis target time-series data corresponding to the diagnosis result information, the learned-sample subsequence data item stored in the storage means.

Advantageous Effects of Invention

The present disclosure enables provision of a time-series data diagnosis device that can perform additional learning with a small calculation amount and high accuracy by updating a learned-sample subsequence data item generated based on time-series data to be learned.

DESCRIPTION OF EMBODIMENTS

Embodiment 1

Hereinafter, an embodiment of applying a time-series data diagnosis device, an additional learning method and a program according to the present disclosure to online learning during operation is described with reference to the drawings.

Time-series data to be diagnosed is various types of data obtained as time passes from various types of sensors such as a thermometer, a vibrometer, and a voltmeter that are attached to a building or a factory, a device installed in a line of a factory, an automobile, a railway vehicle, or the like. The time-series data diagnosis device, in order to monitor statuses of these devices, acquires the time-series data, performs real-time diagnosis of the time-series data, and outputs a diagnosis result.

In practice, a learned model is built by a teaming device before using the time-series data diagnosis device. The time-series data diagnosis device diagnoses time-series data transmitted in real time with reference to the learned model. Further, in order to improve diagnostic accuracy, the time-series data diagnosis device performs additional teaming during operation to update the learned model.

Figure 1:
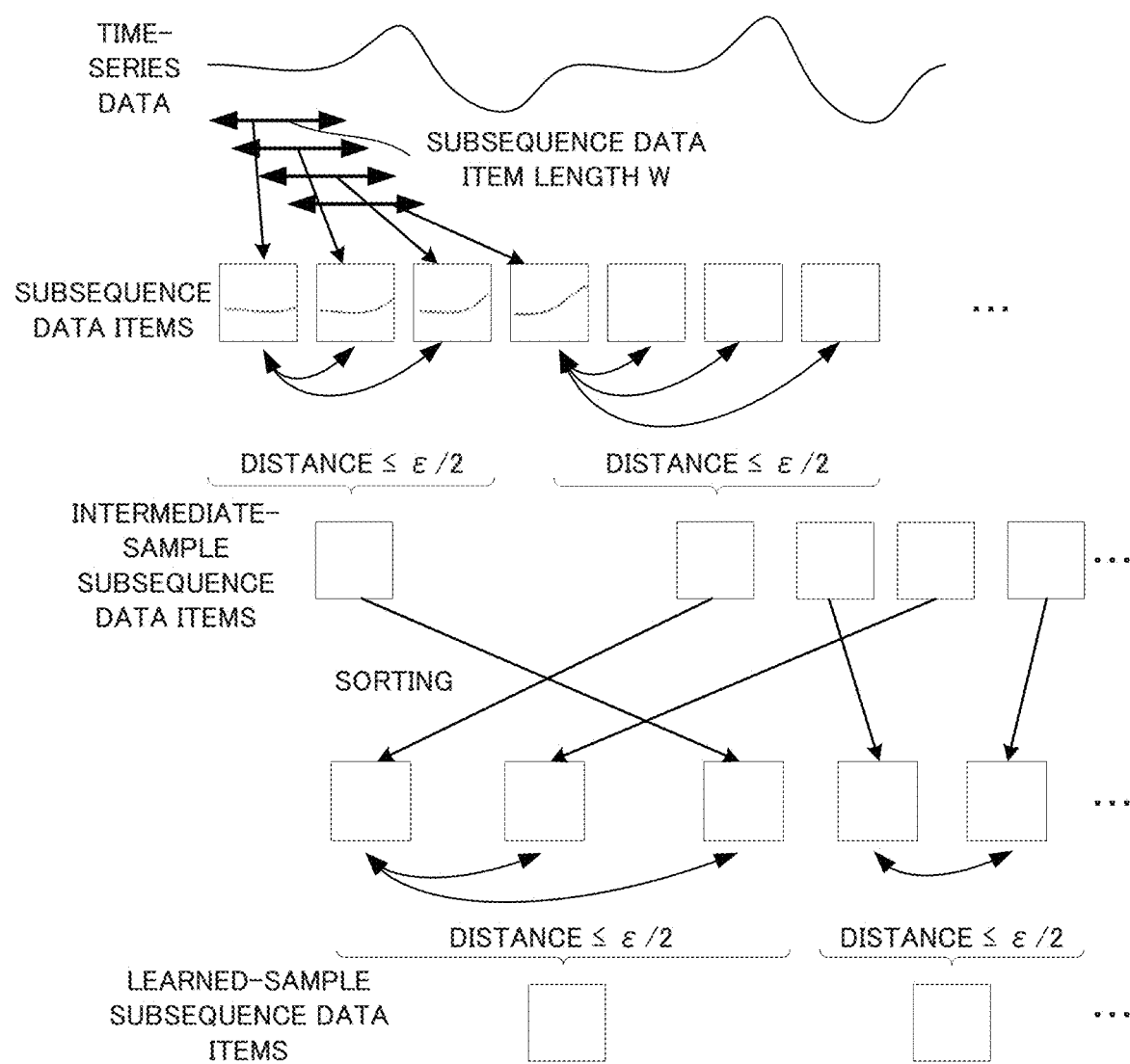
FIG. 1 illustrates an example method of building a learned model according to Embodiment 1 of the present disclosure.

First, a method for building the learned model that serves as a prerequisite for the present embodiment is described with reference to FIG. 1.

An example of building the learned model using a learning device other than the time-series data diagnosis device according to the present embodiment is described. However, the time-series data diagnosis device may double as the learning device. According to the present embodiment, the teaming device acquires normal time-series data and generates the learned model, and the time-series data diagnosis device thus diagnoses time-series data similar to the generated learned model to be normal.

Learning target time-series data that is to be learned is digital data in which time and data are associated and that is obtained by converting continuous values at a specific sampling rate into discrete data. The learning device first extracts, from the acquired learning target time-series data, W pieces of data that are temporarily sequential. The extracted W pieces of data are called a subsequence data item, and W is called as a subsequence data item length. The learning device generates the subsequence data items sequentially by performing incremental sliding of a period for which the time-series data is extracted.

Then the learning device groups the time-series data into groups that each include subsequence data items that are temporarily sequential and similar to each other. Time-series data acquired from a device typically has continuous values and subsequence data items that are temporarily sequential tend to be mutually similar, and this is because grouping of subsequence data items that are temporarily sequential is performed. Further, since each of the subsequence data items includes W pieces of data and can be deemed as a point in a W-dimensional space, a degree of mutual difference between two of the subsequence data items can be expressed as a Euclidean distance between two points in the W-dimensional space. Thus the degree of mutual difference increases with Euclidean distance, and such increased distance indicates that the two subsequence data items are mutually dissimilar.

The learning device groups together (i) a head subsequence data item that serves as a reference and (ii) subsequence data items whose distances to the head subsequence data item are less than or equal to a specific threshold value. In the case where a subsequence data item whose distance to a head subsequence data item exceeds the specific threshold value, the learning device performs similar processing by setting the subsequence data item as a new head subsequence data item. This threshold value is taken to be $\varepsilon/2$, using a sampling error upper limit $\varepsilon$ that is an upper limit of an approximation error that is acceptable in view of a sample generated based on a statistical value. This sampling error upper limit c is set in advance using a statistical value of the time-series data. Further, the subsequence data items belonging to one group are subsequence data items whose distances to a head subsequence data item of the group are less than or equal to $\varepsilon/2$. Thus all subsequence data items belonging to one group are included in the inside of a W-dimensional sphere of radius $\varepsilon/2$ centered at a point indicating the head subsequence data item of the one group, and the mutual distance between freely selected subsequence data items belonging to the same group is less than or equal to $\varepsilon$.

Then the learning device generates intermediate-sample subsequence data items that each are obtained by averaging a corresponding group of the subsequence data items. The sample subsequence data item of a group is represented by a statistical value of W pieces of data that are included in each of the subsequence data items belonging to the group. This statistical value may be an average value such as an arithmetic mean and a geometric mean or may be any other statistic. Typically, a point in a W-dimensional space representing the intermediate-sample subsequence data item may be a centroid of each of the subsequence data items. For example, in the case of employing an arithmetic mean as the statistical value, an intermediate-sample subsequence data item including three subsequence data items of a subsequence data item A (a, b, c), a subsequence data item B (d, e, f), and a subsequence data item C (g, h, i) is expressed by ((a+d+g)/3, (b+e+h)/3, (c+f+i)/3).

Then the learning device calculates a feature amount for each intermediate-sample subsequence data item and sorts the intermediate-sample subsequence data items in order of the feature amount. The feature amount may be an average value of W pieces of data included in the intermediate-sample subsequence data item. This sorting is processing that utilizes the tendency of time-series data acquired from a device to have periodicity. By performing this sorting, the learning device can arrange close to each other intermediate-sample subsequence data items that are not temporarily sequential but are mutually similar to each other.

Then the learning device performs processing similar to the above-described processing of generating the intermediate-sample subsequence data items, thereby grouping the sorted intermediate-sample subsequence data items into groups that each include intermediate-sample subsequence data items that are similar to each other. Then the learning device, based on statistical values that are calculated for the groups of the intermediate-sample subsequence data items, generates learned-sample subsequence data items.

Further, the learning device newly acquires the time-series data as trial data. Then the learning device calculates difference degrees between the trial data and the learned-sample subsequence data items and calculates statistical values of the difference degrees such as a mean value m of the difference degrees and a standard deviation 6 of the difference degrees. Then the learning device, based on these statistical values, determines, as parameters for diagnostic use, a threshold value Tha and a threshold value Thb of the difference degrees. The parameters for diagnostic use also include the subsequence data item length W.

The threshold value Thb that is a second threshold value is larger than the threshold value Tha that is a first threshold value. For example, Tha is set at 50, and Thb is set at 70. In the case where these numerical values are employed in diagnosis-result-information generation processing described later, when the difference degree between time-series data and the learned-sample subsequence data items is larger than or equal to Tha (that is, larger than or equal to 50), a determination is made that the time-series data is abnormal. Further, in additional learning processing described later, when the difference degree between time-series data and the learned-sample subsequence data items is larger than or equal to Thb (that is, larger than or equal to 70), the time-series data is reflected in the learned-sample subsequence data items by adding, to the learned-sample subsequence data items, additional-sample subsequence data items generated from the time-series data. When the difference degree between time-series data and the learned-sample subsequence data items is smaller than or equal to Thb (that is, equal to or smaller than 70), the time-series data is reflected in the learned-sample subsequence data items by updating the learned-sample subsequence data items.

In the manner described above, the learning device generates, as the learned model, the learned-sample subsequence data items and the parameters for diagnostic use.

Figure 2:
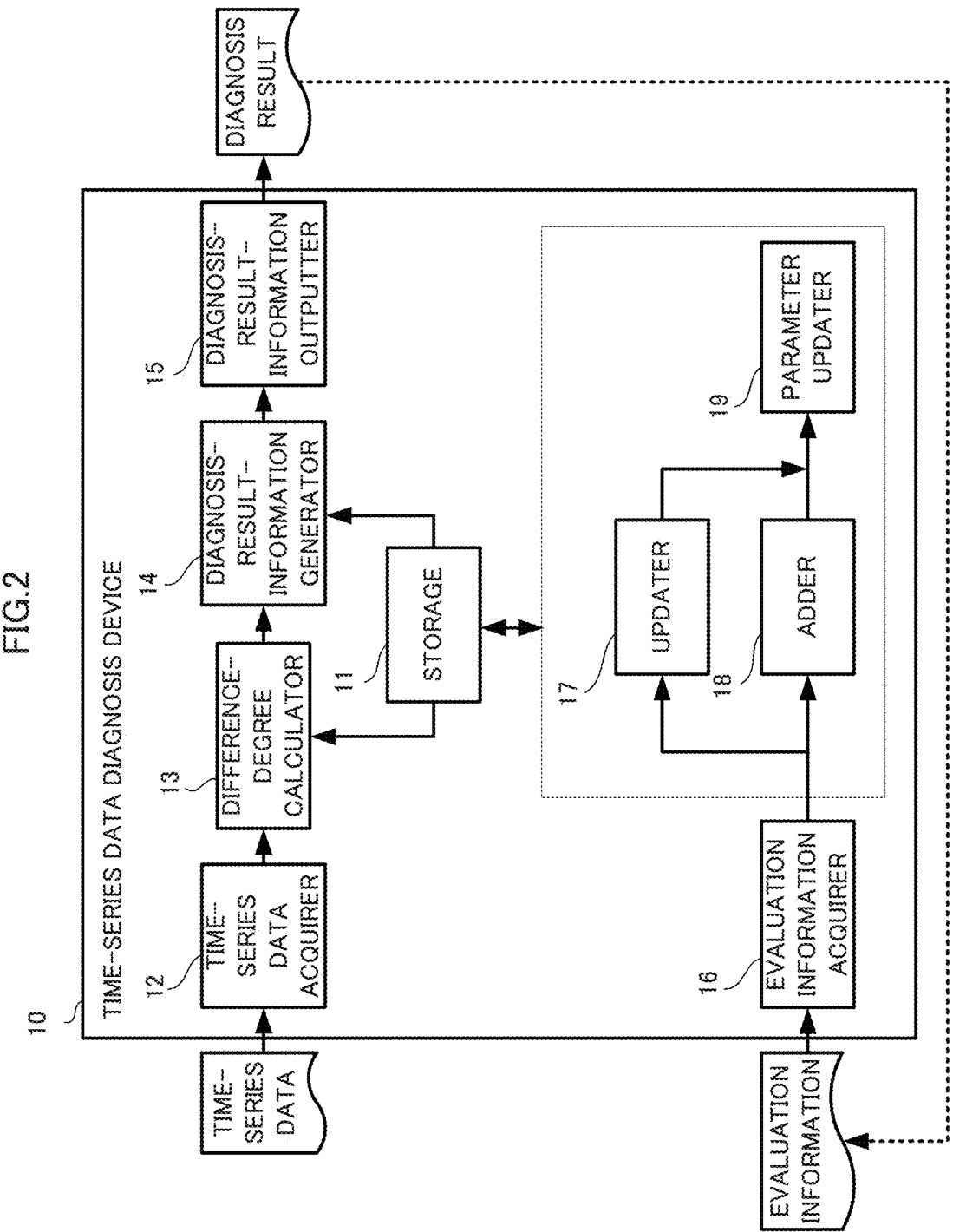
FIG. 2 is a functional block diagram of a time-series data diagnosis device according to Embodiment 1 of the present disclosure.

Next, functional configuration of a time-series data diagnosis device 10 according to the present embodiment is described with reference to FIG. 2.

The time-series data diagnosis device 10 includes: a storage 11 that stores various types of data, a time-series data acquirer 12 that acquires time-series data, a difference-degree calculator 13 that generates difference-degree information, a diagnosis-result-information generator 14 that generates diagnosis result information, a diagnosis-result-information outputter 15 that outputs the diagnosis result information, an evaluation information acquirer 16 that acquires evaluation information, an updater 17 that updates the learned-sample subsequence data items, an adder 18 that adds the learned-sample subsequence data items, and a parameter updater 19 that updates the parameters.

The storage 11 stores the learned model generated by the learning device described above, that is, stores (i) the learned-sample subsequence data items and (ii) the parameters including the threshold value Tha and the threshold value Thb of the difference degrees, the subsequence data item length W, or the like. Further, the storage 11 also stores, as intermediate data, the intermediate-sample subsequence data items generated by the learning device. Moreover, the storage 11 stores the trial data used by the learning device to generate the parameters.

The time-series data acquirer 12 acquires diagnosis target time-series data that is to be diagnosed from a time-series data transmission device 30.

The difference-degree calculator 13 calculates difference degrees between the acquired time-series data and the learned-sample subsequence data items stored in the storage 11. Specifically, the difference-degree calculator 13 extracts multiple subsequence data items that each have the subsequence data item length W, and calculates distances between the extracted subsequence data items and the learned-sample subsequence data items. A distance that is the shortest among the calculated distances is set as the difference degree.

The diagnosis-result-information generator 14 compares the difference degree generated by the difference-degree calculator 13 and the threshold value Tha included in the parameters stored in the storage 11 and generates the diagnosis result information. Specifically, when the difference degree between the diagnosis target time-series data and the learned-sample subsequence data items is larger than or equal to the threshold value Tha, the diagnosis-result-information generator 14 generates the diagnosis result information indicating that the diagnosis target time-series data is abnormal, and when the difference degree between the diagnosis target time-series data and the learned-sample subsequence data items is smaller than the threshold value Tha, the diagnosis-result-information generator 14 generates the diagnosis result information indicating that the diagnosis target time-series data is normal.

The diagnosis-result-information outputter 15 outputs the diagnosis result information generated by the diagnosis-result-information generator 14. Specifically, the diagnosis-result-information outputter 15 displays the diagnosis result information on a display described later. Alternatively, the diagnosis-result-information outputter 15 may transmit the diagnosis result information to, for example, an external device or an external system.

The evaluation information acquirer 16 acquires the evaluation information indicating evaluation as to whether a diagnosis result indicated by the diagnosis result information is valid. Specifically, a person who is in charge of inspecting the diagnosis result information output by the diagnosis-result-information outputter 15, in overall consideration of the diagnosis target time-series data, an actual state of a device, and past experience, evaluates whether the diagnosis result information is valid. The person in charge inputs the evaluation information by operating a keyboard described later, and the evaluation information acquirer 16 acquires the evaluation information input by the person in charge. The evaluation that the diagnosis result information is not valid is made in the case where the diagnosis result indicates "normal" but the diagnosis result indicating "abnormal" is appropriate or in the case where the diagnosis result indicates "abnormal" but the diagnosis result indicating "normal" is appropriate. The evaluation information acquirer 16 may acquire the evaluation information from, for example, an external device and an external system.

The updater 17, when the difference degree calculated by the difference-degree calculator 13 is larger than or equal to the threshold value Tha and the evaluation information acquired by the evaluation information acquirer 16 indicates evaluation that the diagnosis result is not valid, groups the time-series data corresponding to the diagnosis result information into groups that each include subsequence data items that are temporarily sequential and the difference degrees therebetween are smaller than or equal to ε/2. Then the updater 17, based on statistical values of the subsequence data items included in the corresponding group, generates update-intermediate-sample subsequence data items that are used to update the sample subsequence data items. Then the updater 17 combines the update-intermediate-sample subsequence data items and the intermediate-sample subsequence data items stored in the storage 11 and further performs grouping into intermediate-sample subsequence data items having the difference degrees therebetween equal to or smaller than ε/2. Then the updater 17 generates sample subsequence data items based on statistical values of the corresponding groups. Further, the updater 17, using the generated sample subsequence data items, updates the learned-sample subsequence data items stored in the storage 11.

The adder 18, when the difference degree calculated by the difference-degree calculator 13 is larger than or equal to the threshold value Tha and the evaluation information acquired by the evaluation information acquirer 16 indicates evaluation that the diagnosis result is not valid, generates additional-sample subsequence data items based on the time-series data corresponding to the diagnosis result information. Then the adder 18 adds the additional-sample subsequence data items to the learned-sample subsequence data items stored in the storage 11.

The parameter updater 19, when the evaluation information acquired by the evaluation information acquirer 16 indicates evaluation that the diagnosis result is not valid, updates the parameters based on the updated sample subsequence data items.

Figure 3:
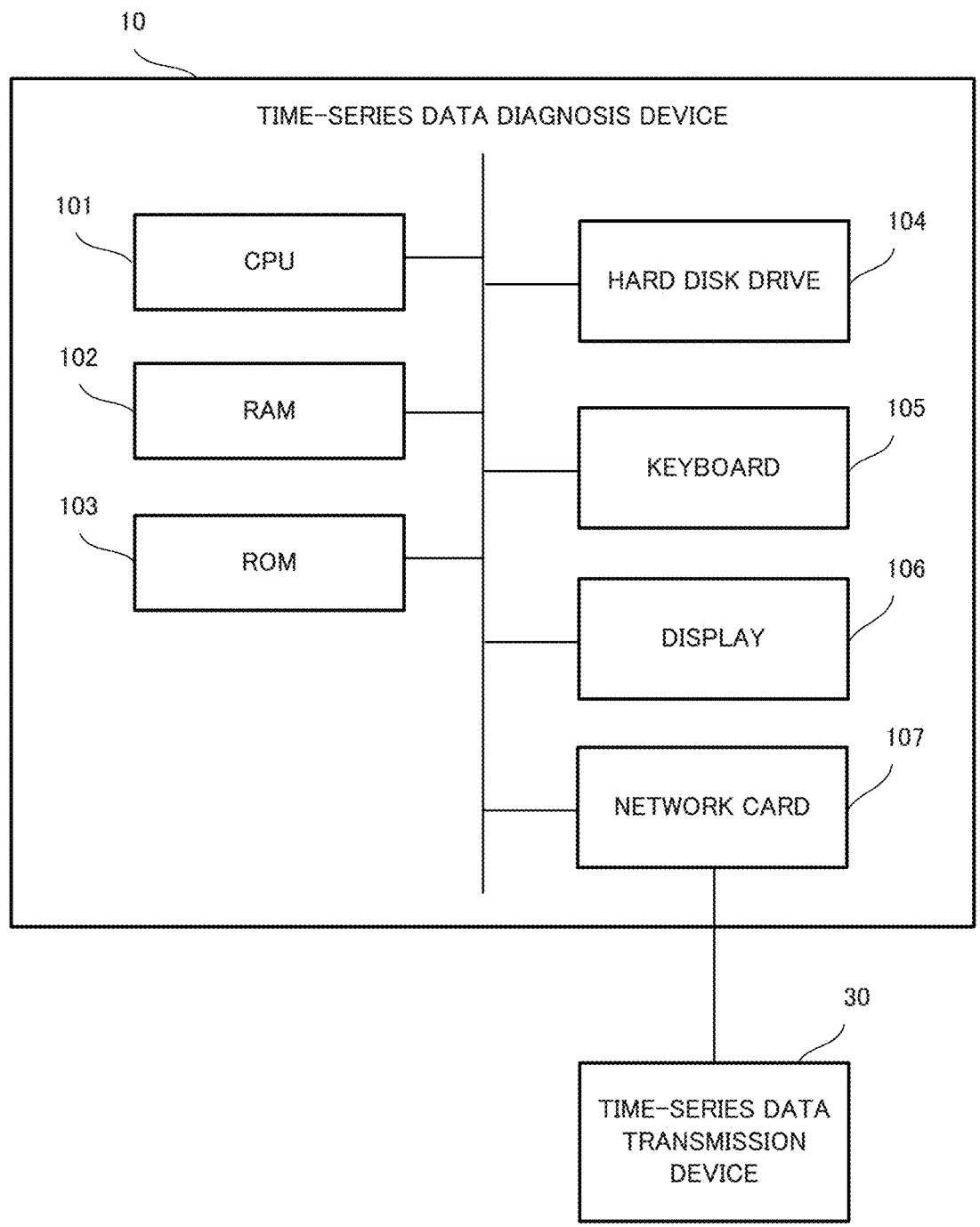
FIG. 3 is a hardware configuration diagram of the time-series data diagnosis device according to Embodiment 1 of the present disclosure.

Next, hardware configuration of the time-series data diagnosis device 10 is described with reference to FIG. 3. The time-series data diagnosis device 10 includes a central processing unit (CPU) 101 that executes various types of processing, random access memory (RAM) 102 that is a volatile memory, read only memory (ROM) 103 that is a nonvolatile memory, a hard disk drive 104 that stores various types of information, a keyboard 105 that receives an operation, a display 106 that displays information, and a network card 107 that transmits and receives information.

The CPU 101 loads a program stored in the hard disk drive 104 into the RAM 102 to execute the program, thereby executing various types of processing described later.

The RAM 102 is a volatile memory and is used by the CPU 101 as a work area.

The ROM 103 is a nonvolatile memory and stores a control program, a basic input output system (BIOS) or the like that are executed by the CPU 101 and for basic operations of the time-series data diagnosis device 10.

The CPU 101, the RAM 102, and the ROM 103 cooperate to function as the difference-degree calculator 13, the diagnosis-result-information generator 14, the updater 17, the adder 18 and the parameter updater 19 that are described above.

The hard disk drive 104 is a medium for storing information and stores various types of data items described above. The hard disk drive 104 functions as the storage 11.

The keyboard 105 is an information input device and receives various types of information input by operation of a user. The keyboard 105 functions as the evaluation information acquirer 16.

The display 106 is an information display device such as a liquid crystal panel and a projector. The display 106 displays information as may be required for the operation by the user. The display 106 functions as the diagnosis-result-information outputter 15.

The network card 107 is a communication device that communicates information with an external device and is communicably connected to the time-series data transmission device 30. The network card 107 functions as the time-series data acquirer 12. Further, depending on the situation, the network card 107 also functions as the diagnosis-result-information outputter 15 or the evaluation information acquirer 16.

Figure 4:
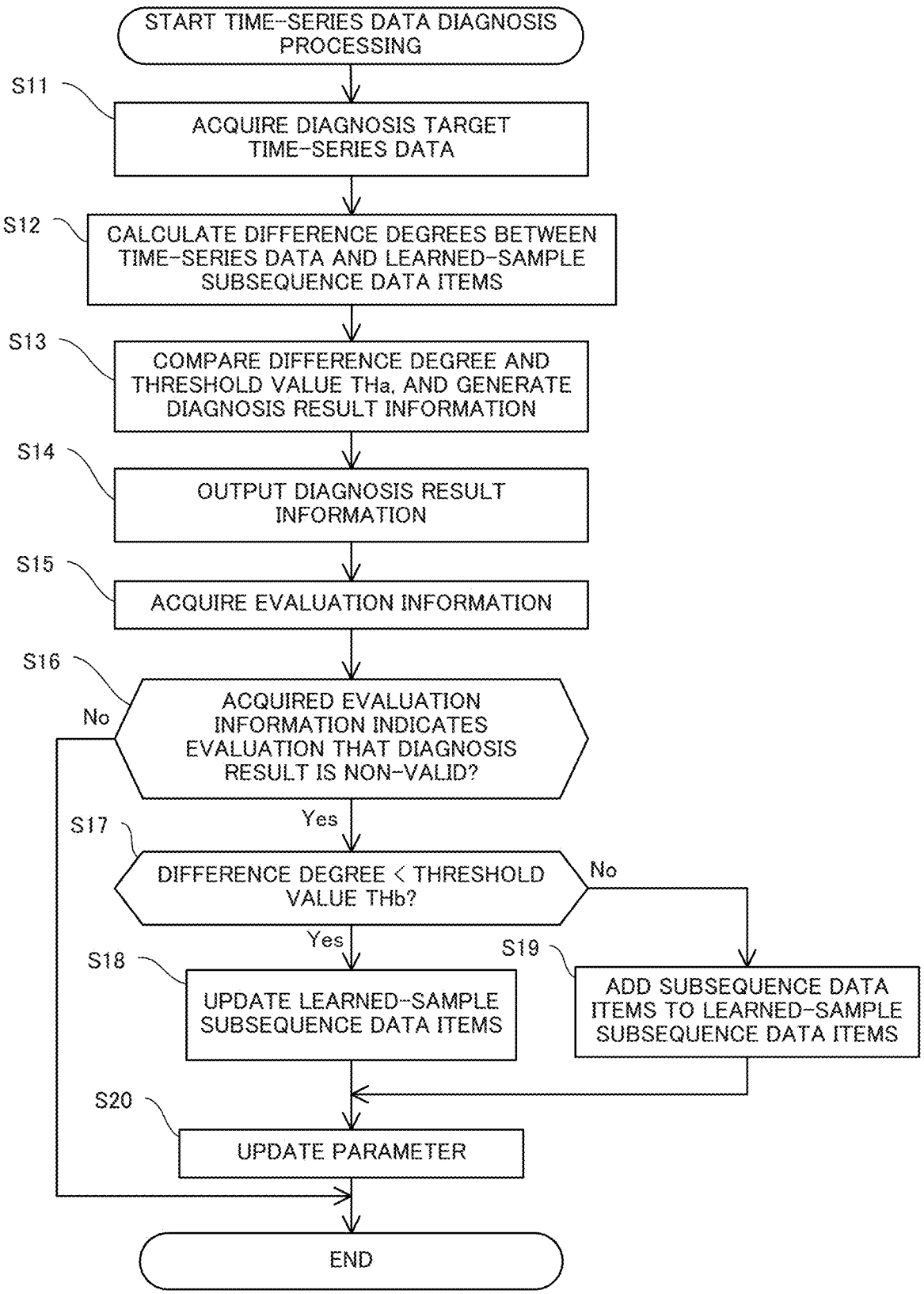
FIG. 4 is a flowchart of time-series data diagnosis device processing according to Embodiment 1 of the present disclosure.

Next, an operation of the time-series data diagnosis device 10 is described with reference to FIG. 4.

The storage 11 of the time-series data diagnosis device 10 stores (i) the learned-sample subsequence data items that serve as the learned model and (ii) the parameters including the threshold value Tha and the threshold value Thb of the difference degrees and the subsequence data item length W. Further, the storage 11 also stores the intermediate-sample subsequence data items and the trial data. Thus the storage 11 functions as storage means for storing the intermediate-sample subsequence data items, the learned-sample subsequence data items, and the parameters.

When a user of the time-series data diagnosis device 10 operates the keyboard 105 to input a request to start time-series data diagnosis processing, the time-series data acquirer 12 of the time-series data diagnosis device 10 acquires the diagnosis target time-series data from the time-series data transmission device 30 (step S11).

Then the difference-degree calculator 13 calculates the difference degrees between the time-series data acquired in step S11 and the learned-sample subsequence data items stored in the storage 11 (step S12). Specifically, the difference-degree calculator 13 extracts multiple subsequence data items that each have the subsequence data item length W, and calculates distances between the extracted subsequence data items and the learned-sample subsequence data items. The difference-degree calculator 13 sets, as the difference degree between the time-series data and the learned-sample subsequence data items, a distance that is the shortest among the calculated distances. In this step S12, the difference-degree calculator 13 functions as difference-degree calculation means for calculating the difference degrees between the diagnosis target time-series data and the learned-sample subsequence data items stored in the storage 11. Further, this step S12 functions as a difference-degree calculation step of calculating difference degrees.

Then the diagnosis-result-information generator 14 compares the difference degree generated in step S12 and the threshold value Tha, and generates the diagnosis result information (step S13). Specifically, when the difference degree between the diagnosis target time-series data and the learned-sample subsequence data items is larger than or equal to the threshold value Tha, the diagnosis-result-information generator 14 generates the diagnosis result information indicating that the diagnosis target time-series data is abnormal, and when the difference degree between the diagnosis target time-series data and the learned-sample subsequence data items is smaller than the threshold value Tha, the diagnosis-result-information generator 14 generates the diagnosis result information indicating that the diagnosis target time-series data is normal. In this step S13, the diagnosis-result-information generator 14 functions as diagnosis-result-information generation means for (i) comparing the difference degree generated by the difference-degree calculator 13 and a first threshold value and (ii) generating the diagnosis result information about the diagnosis target time-series data. Further, this step S13 functions as a diagnosis-result-information generating step of generating diagnosis result information.

Then the diagnosis-result-information outputter 15 outputs the diagnosis result information generated by the diagnosis-result-information generator 14 (step S14). Specifically, the diagnosis-result-information outputter 15 displays the diagnosis result information on the display 106. Alternatively, the diagnosis-result-information outputter 15 may transmit the diagnosis result information via the network card 107 to, for example, an external device and an external system.

Then the evaluation information acquirer 16 acquires the evaluation information indicating evaluation as to whether a diagnosis result indicated by the diagnosis result information is valid (step S15). Specifically, a person who is in charge of inspecting the diagnosis result information output in step S14, in overall consideration of the diagnosis target time-series data, an actual state of a device, and past experience, evaluates whether the diagnosis result indicated by the diagnosis result information is valid. The person in charge inputs the evaluation information by operating the keyboard 105, and the evaluation information acquirer 16 acquires the evaluation information input by the person in charge. The evaluation information acquirer 16 may acquire the evaluation information from, for example, an external device and an external system. In this step S15, the evaluation information acquirer 16 functions as evaluation information acquisition means for acquiring the evaluation information indicating evaluation as to whether the diagnosis result indicated by the diagnosis result information is valid. Further, this step S15 functions as an evaluation information acquiring step of acquiring evaluation information.

Then the time-series data diagnosis device 10 determines whether the evaluation information acquired in step S15 indicates evaluation that the diagnosis result is non-valid (step S16). Specifically, when (i) the time-series data is evaluated to be abnormal contrary to the diagnosis result indicating that the time-series data is normal or (ii) the time-series data is evaluated to be normal contrary to the diagnosis result indicating that the time-series data is abnormal, the time-series data diagnosis device 10 determines that the evaluation information indicates evaluation that the diagnosis result is not valid.

When the determination is made that the evaluation information acquired in step S15 indicates evaluation that the diagnosis result is non-valid (YES in step S16), the time-series data diagnosis device 10 determines whether the difference degree calculated in step S12 is smaller than the threshold value Thb included in the parameters stored in the storage 11 (step S17). Conversely, when the determination is made that the evaluation information acquired in step S15 does not indicate evaluation that the diagnosis result is non-valid (NO in step S16), the time-series data diagnosis device 10 ends the time-series data diagnosis processing.

Figure 5:
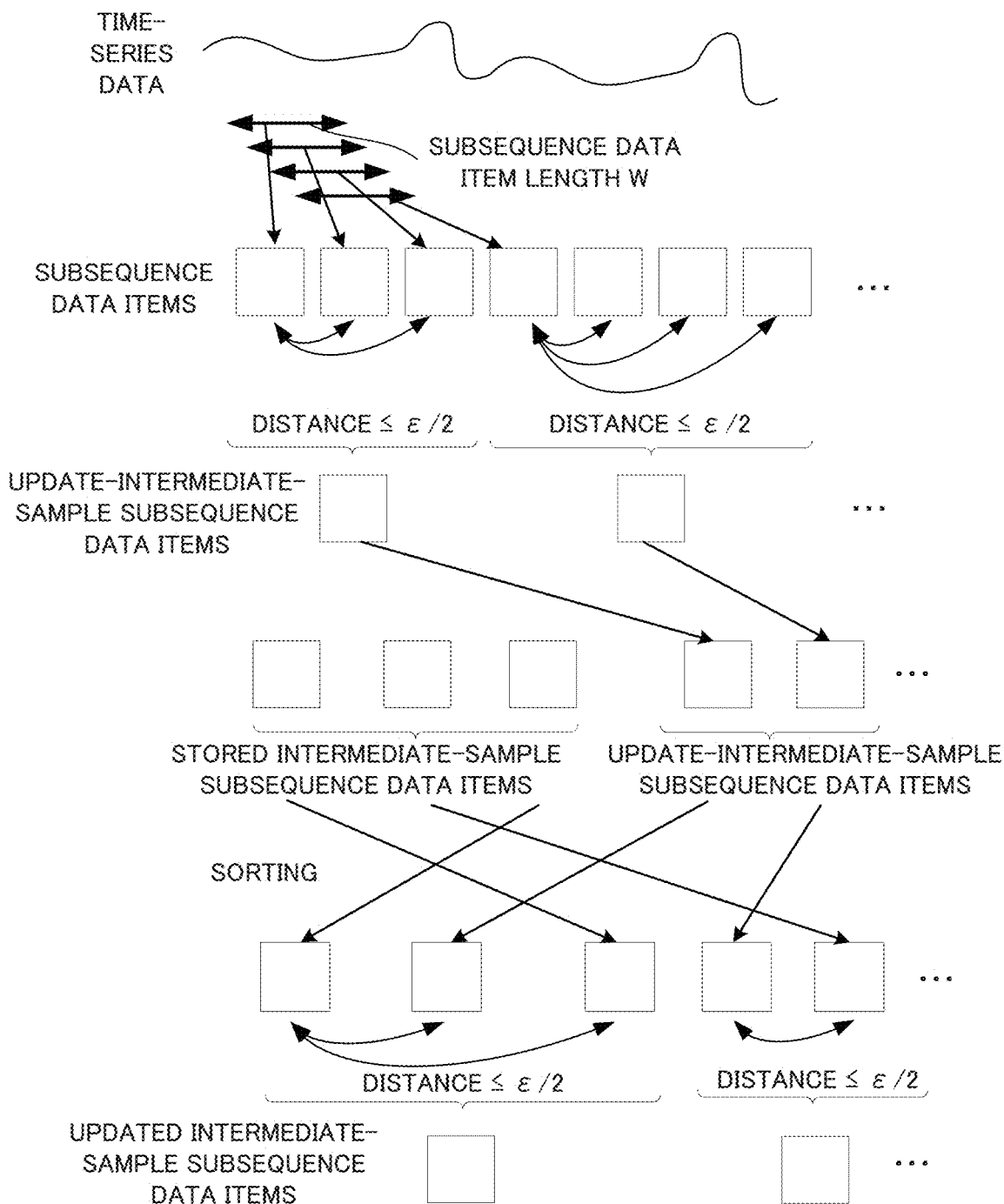
FIG. 5 illustrates an example method of updating learned-sample subsequence data items according to Embodiment 1 of the present disclosure.

When the time-series data diagnosis device 10 determines that the difference degree is smaller than the threshold value Thb (YES in step S17), the updater 17 updates the learned-sample subsequence data items (step S18). Specifically, the updater 17 specifies, as a target of update processing, the learned-sample subsequence data items based on which the difference degree smaller than Thb is obtained. Then the updater 17 generates the intermediate-sample subsequence data items by performing processing similar to the building method of the learned model, as illustrated in FIG. 5. These generated intermediate-sample subsequence data items are called the "update-intermediate-sample subsequence data items". Then the updater 17 combines the generated update-intermediate-sample subsequence data items and the intermediate-sample subsequence data items stored in the storage 11 and corresponding to learned-sample subsequence data items specified as the target of update and sorts these subsequence data items in order of the feature amount thereof.

Then the updater 17 groups the sorted intermediate-sample subsequence data items into groups that each include intermediate-sample subsequence data items similar to each other. Then the updater 17 generates, based on statistical values that are calculated for the groups of intermediate-sample subsequence data items, post-update learned-sample subsequence data items. In this step S18, the updater 17 functions as update means for updating, using the generated sample subsequence data items, the learned-sample subsequence data items stored in the storage 11. Further, this step S18 functions as an updating step of updating learned-sample subsequence data items.

Again with reference to FIG. 4, when the time-series data diagnosis device 10 determines that the difference degree is larger than or equal to the threshold value Thb (NO in step S17), the adder 18 adds subsequence data items to the learned-sample subsequence data items (step S19). Specifically, the adder 18 generates, from the time-series data corresponding to the diagnosis result information, in a manner similar to that in building the learned model, the additional-sample subsequence data items. Then the adder 18 adds the generated additional-sample subsequence data items to the learned-sample subsequence data items stored in the storage 11. In this step S19, the adder 18 functions as addition means for adding additional-sample subsequence data items to the learned-sample subsequence data items stored in the storage 11.

Following step S18 or step S19, the parameter updater 19 updates the parameters for diagnostic use that are stored in the storage 11 (step S20). Specifically, the parameter updater 19 calculates difference degrees between (i) the trial data stored in the storage 11 and (ii) the updated or added learned-sample subsequence data items, and recalculates the statistical values of the difference degrees such as a mean value m of the difference degrees and a standard deviation 6 of the difference degrees, in a manner similar to that in building the learned model. Then the parameter updater 19, based on these statistical values, updates the threshold value Tha and the threshold value Thb that are difference degrees serving as parameters for diagnostic use. In this step S20, the parameter updater 19 functions as parameter update means for updating the parameters based on updated learned-sample subsequence data items.

The time-series data diagnosis device 10 according to the present embodiment can, instead of performing rebuilding of a learned model based on (i) time-series data that is a target of additional learning and (ii) time-series data used to build the learned model, generate the learned-sample subsequence data items by utilizing the intermediate-sample subsequence data items generated in building the learned model, thereby enabling suppression of the calculation amount. Thus the time-series data diagnosis device 10 is suitable for additional learning, especially for online learning in which additional learning is to be performed during operation. Further, the time-series data used in performing the additional learning and the time-series data used in building the learned model are not temporarily sequential, and thus the result obtained by employment of this device has almost no difference in accuracy from a result obtained in the case of rebuilding the learned model. This enables additional learning with a small calculation amount and high accuracy.

Further, the time-series data diagnosis device 10 according to the present embodiment, using the threshold value Thb, determines which one of (i) updating of the learned-sample subsequence data items by use of the updater 17 or (ii) addition to the learned-sample subsequence data items by use of the adder 18 is to be performed. Thus, updating of the learned-sample subsequence data items is performed upon presence of a learned-sample subsequence data item similar to the time-series data to be additionally learned, and addition of new learned-sample subsequence data items is performed upon absence of a learned-sample subsequence data item similar to the time-series data to be additionally learned. This enables appropriate additional learning without an excessive increase in the amount of the learned-sample subsequence data item.

Embodiment 2

Embodiment 1 describes an example of, when the evaluation information indicating "normal" is acquired contrary to the diagnosis result information indicating "abnormal", updating or adding the learned-sample subsequence data items. The present embodiment describes an example of, when the evaluation information indicating "abnormal" is acquired contrary to the diagnosis result information indicating "normal", deleting the learned-sample subsequence data items. Hereinafter, differences from Embodiment 1 are mainly described.

Figure 6:
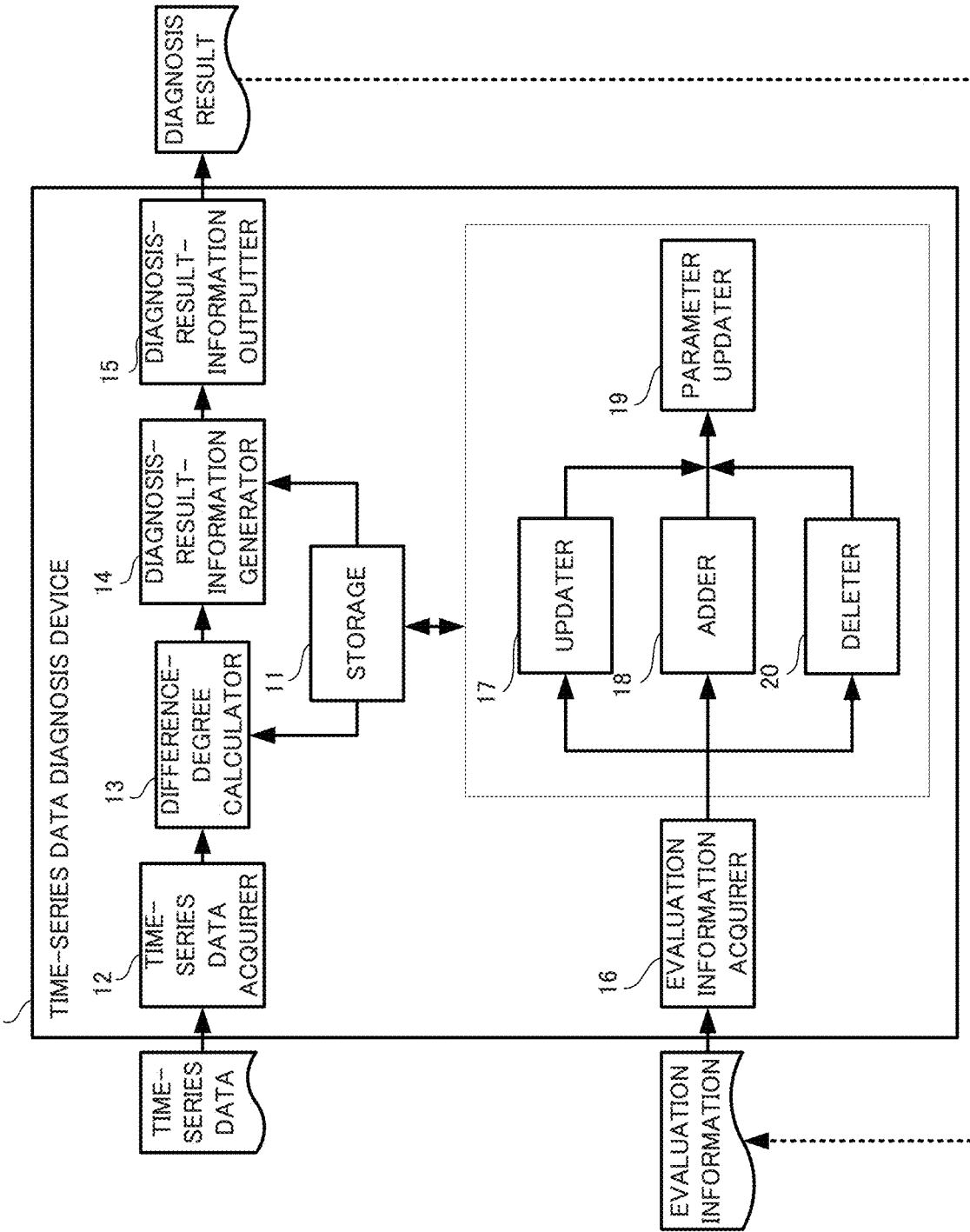
FIG. 6 is a functional block diagram of a time-series data diagnosis device according to Embodiment 2 of the present disclosure.

As illustrated in FIG. 6, the time-series data diagnosis device 10 according to the present embodiment includes, in addition to the functional elements described in Embodiment 1, a deleter 20 that deletes the learned-sample subsequence data item.

The deleter 20, when the difference degree calculated by the difference-degree calculator 13 is smaller than the threshold value Tha and the evaluation information acquired by the evaluation information acquirer 16 indicates evaluation that the diagnosis result is not valid, deletes from the storage 11 learned-sample subsequence data items whose difference degree from the time-series data corresponding to the diagnosis result is smaller than the threshold value Tha.

Figure 7:
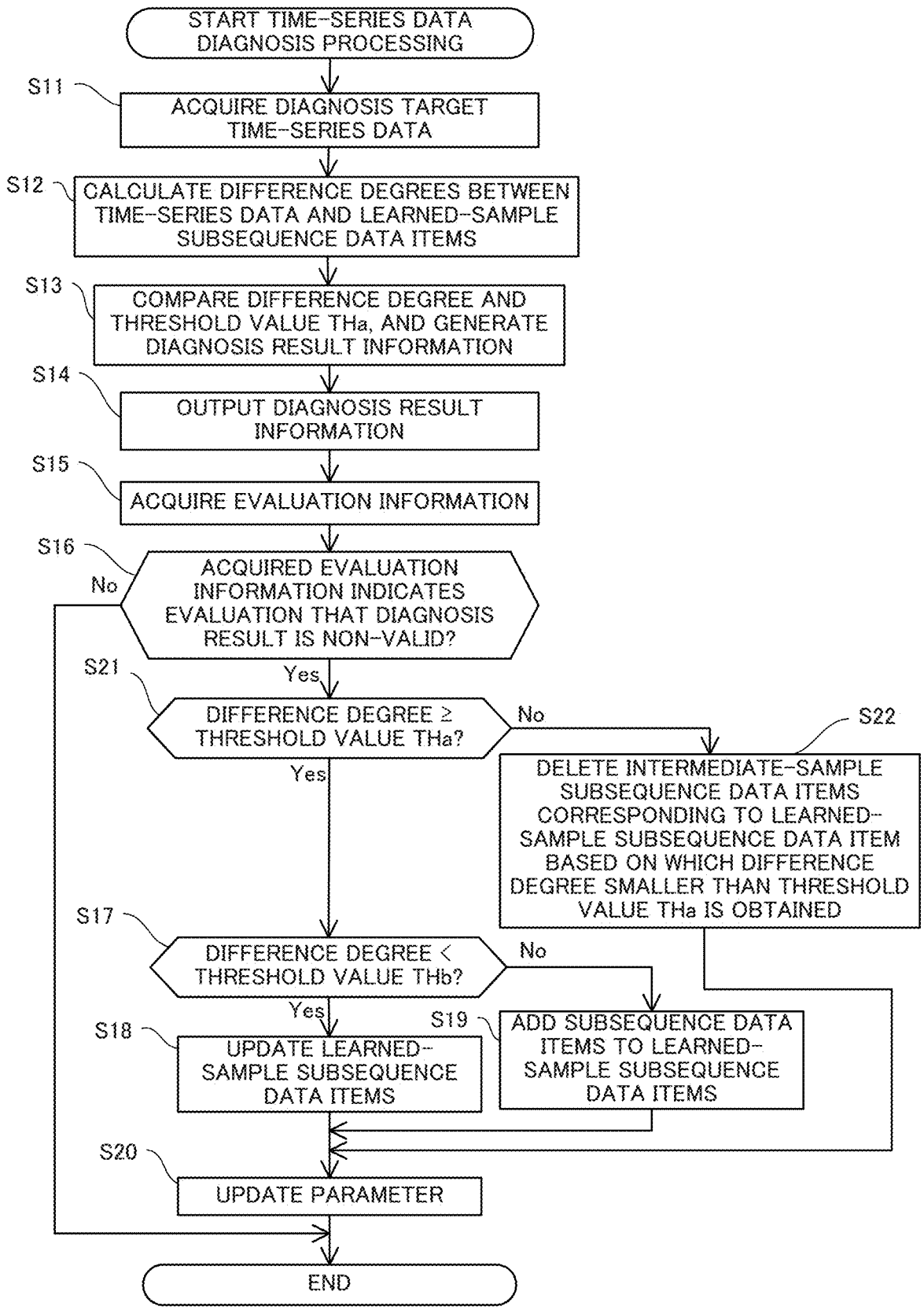
FIG. 7 is a flowchart of time-series data diagnosis processing according to Embodiment 2 of the present disclosure.

More specifically, such deletion and operation of the time-series data diagnosis device 10 are described with reference to the drawings. As illustrated in FIG. 7, when the determination is made in step S16 of the time-series data diagnosis processing that the evaluation information acquired in step S15 indicates evaluation that the diagnosis result is non-valid (YES in step S16), the time-series data diagnosis device 10 determines whether the difference degree calculated in step S12 is larger than or equal to the threshold value Tha (step S21). When a determination is made that the difference degree is larger than or equal to the threshold value Tha (YES in step S21), the processing proceeds to step S17 that is processing of determining whether the difference degree is smaller than the threshold value Thb, and thereafter, the time-series data diagnosis device 10 performs processing similar to that performed in Embodiment 1.

Conversely, when the time-series data diagnosis device 10 determines that the difference degree is smaller than the threshold value Tha (NO in step S21), the deleter 20 deletes the intermediate-sample subsequence data items corresponding to a learned-sample subsequence data item based on which the difference degree smaller than the threshold value Tha is obtained (step S22). In step S12, the difference degree is calculated using a combination of the time-series data and a learned-sample subsequence data item based on which the smallest difference degree is obtained, and thus there exists at least one learned-sample subsequence data item whose difference degree from the time-series data is smaller than the threshold value Tha is expected to exist. Thus, more specifically, the deleter 20 calculates difference degrees between the time-series data and the intermediate-sample subsequence data items corresponding to the learned-sample subsequence data item based on which the difference degree smaller than the threshold value Tha is obtained. Then the deleter 20 deletes an intermediate-sample subsequence data item included in the intermediate-sample subsequence data items and based on which a difference degree smaller than the threshold value Tha is calculated.

Further, the deleter 20 updates the learned-sample subsequence data items based on undeleted intermediate-sample subsequence data items. In this step S22, the deleter 20 functions as deletion means for (i) deleting an intermediate-sample subsequence data item that is stored in the storage 11 whose difference degree from the diagnosis target time-series data is smaller than the threshold value Tha and (ii) updating the learned-sample subsequence data items stored in the storage 11 based on intermediate-sample subsequence data items remaining after the deletion.

Following step S22, similarly to Embodiment 1, the parameter updater 19, based on the post-update learned-sample subsequence data items, updates the parameters (step S20).

The time-series data diagnosis device 10 according to the present embodiment, when the evaluation information indicating "abnormal" is acquired contrary to the diagnosis result information indicating "normal", updates the learned-sample subsequence data items. This further improves accuracy of the learned-sample subsequence data items.

Furthermore, the time-series data diagnosis device 10 according to the present embodiment updates the learned-sample subsequence data items by performing deletion of an intermediate-sample subsequence data item. The calculation amount thus can be suppressed in comparison to the case in which the time-series data is deleted to delete the intermediate-sample subsequence data items. Moreover, additional learning is enabled with an accuracy higher than that in the case of deletion of the learned-sample subsequence data items.

MODIFIED EXAMPLES

The present disclosure is not limited to the aforementioned embodiments, and various types of changes can be made to the present disclosure.

The aforementioned embodiments describe examples of (i) building a learned model using time-series data from a device operating normally and (ii) determining, in the case of a small difference degree from the learned-sample subsequence data items, the diagnosis to be normal. However, these examples do not limit the scope of the present disclosure, and a configuration may be employed that includes (i) building a learned model using time-series data of a device operating abnormally and (ii) determining, in the case of a small difference degree from the learned-sample subsequence data items, the diagnosis to be abnormal. The present disclosure can be applied to such configuration by replacing all the "normal" and "abnormal" of the aforementioned embodiments with the opposite term.

In the aforementioned embodiments, the time-series data diagnosis device 10 calculates, as the difference degree, Euclidean distance in a W-dimensional space. However, this is one example, and the difference degree may be calculated using another calculation method. Further, the time-series data diagnosis device 10 may double as the learning device.

Although examples are indicated above in which each of the difference degree, the threshold value Tha, and the threshold value Thb is one specific numerical value, each of these values may be a combination of multiple numerical values. In this case, the "threshold value" is to be interpreted to refer to a condition with respect to multiple numerical values.

The time-series data diagnosis device 10 according to the embodiments can be achieved by using a general purpose computer rather than a dedicated device. For example, the time-series data diagnosis device 10 that executes the above-described processing may be achieved by storing a program for execution of any one of the above-described processing in a recording medium and then installing the program on a computer. Further, a single time-series diagnosis device 10 may include multiple computers operating in cooperation with each other.

Furthermore, any method that can supply the program to the computer may be employed. The program may be supplied to the computer via, for example, a communication line, a communication network, and a communication system.

Furthermore, in the case where a portion of the above-described functions is provided by an operating system (OS), a program to provide portions of the function other than the portion provided by the OS may be employed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

Reference Signs List

10 Time-series data diagnosis device
11 Storage
12 Time-series data acquirer
13 Difference-degree calculator
14 Diagnosis-result-information generator
15 Diagnosis-result-information outputter
16 Evaluation information acquirer
17 Updater
18 Adder
19 Parameter updater
20 Deleter
30 Time-series data transmission device
101 CPU
102 RAM
103 ROM
104 Hard disk drive
105 Keyboard
106 Display
107 Network card

The invention claimed is:

1. A time-series data diagnosis device comprising:
a storage to store (i) intermediate-sample subsequence data items that each are generated from a statistical value of subsequence data items included in a corresponding group of groups into which the learning target time-series data is grouped, the subsequence data items included in each group being temporarily sequential and similar to each other, (ii) a learned-sample subsequence data item generated based on the intermediate-sample subsequence data items, and (iii) parameters that include a first threshold value;
a difference-degree calculator to calculate a difference degree between diagnosis target time-series data and the learned-sample subsequence data item stored in the storage;
a diagnosis-result-information generator to generate, by comparing the difference degree calculated by the difference-degree calculator and the first threshold value, diagnosis result information about the diagnosis target time-series data;
an evaluation information acquirer to acquire evaluation information indicating evaluation as to whether a diagnosis result indicated by the diagnosis result information is valid;
an updater to, when the difference degree is larger than or equal to the first threshold value and the evaluation information acquired by the evaluation information acquirer indicates evaluation that the diagnosis result is not valid, (i) generate update-intermediate-sample subsequence data items from statistical values of subsequence data items included in a corresponding group of groups into which the diagnosis target time-series data corresponding to the diagnosis result information evaluated as indicating a non-valid diagnosis result is grouped, the subsequence data items included in each group being temporarily sequential and similar to each other, (ii) generate sample subsequence data items based on the update-intermediate-sample subsequence data items and the intermediate-sample subsequence data items stored in the storage and (iii) update, using the generated sample subsequence data items, the learned-sample subsequence data item stored in the storage.

2. The time-series data diagnosis device according to claim 1, further comprising:
an adder to, when the difference degree is larger than or equal to the first threshold value and the evaluation information acquired by the evaluation information acquirer indicates evaluation that the diagnosis result is not valid, (i) generate additional-sample subsequence data items based on the diagnosis target time-series data corresponding to the diagnosis result information and (ii) add the additional-sample subsequence data items to the learned-sample subsequence data item stored in the storage.

3. The time-series data diagnosis device according to claim 2, wherein
the parameters further include a second threshold value that is larger than the first threshold value,
the updater, when the difference degree is smaller than the second threshold value, updates the learned-sample subsequence data item, and
the adder, when the difference degree is larger than or equal to the second threshold value, adds the generated additional-sample subsequence data item to the learned-sample subsequence data item.

4. The time-series data diagnosis device according to claim 3, further comprising:
a deleter to, when the difference degree is smaller than the first threshold value and the evaluation information acquired by the evaluation information acquirer indicates evaluation that the diagnosis result is not valid, (i) delete, from the storage, from among intermediate-sample subsequence data items corresponding to a learned-sample subsequence data item whose difference degree from the diagnosis target time-series data corresponding to the diagnosis result is smaller than the first threshold value, an intermediate-sample subsequence data item whose difference degree from the diagnosis target time-series data corresponding to the diagnosis result is smaller than the first threshold value and (ii) update the learned-sample subsequence data item stored in the storage based on intermediate-sample subsequence data items remaining after the deletion.

5. The time-series data diagnosis device according to claim 3, further comprising:
a parameter updater to, when the evaluation information acquired by the evaluation information acquirer indicates evaluation that the diagnosis result indicated by the diagnosis result information is not valid, update the parameters based on the updated learned-sample subsequence data item.

6. The time-series data diagnosis device according to claim 2, further comprising:
a deleter to, when the difference degree is smaller than the first threshold value and the evaluation information acquired by the evaluation information acquirer indicates evaluation that the diagnosis result is not valid, (i) delete, from the storage, from among intermediate-sample subsequence data items corresponding to a learned-sample subsequence data item whose difference degree from the diagnosis target time-series data corresponding to the diagnosis result is smaller than the first threshold value, an intermediate-sample subsequence data item whose difference degree from the diagnosis target time-series data corresponding to the diagnosis result is smaller than the first threshold value and (ii) update the learned-sample subsequence data item stored in the storage based on intermediate-sample subsequence data items remaining after the deletion.

7. The time-series data diagnosis device according to claim 2, further comprising:
a parameter updater to, when the evaluation information acquired by the evaluation information acquirer indicates evaluation that the diagnosis result indicated by the diagnosis result information is not valid, update the parameters based on the updated learned-sample subsequence data item.

8. The time-series data diagnosis device according to claim 1, further comprising:
a deleter to, when the difference degree is smaller than the first threshold value and the evaluation information acquired by the evaluation information acquirer indicates evaluation that the diagnosis result is not valid, (i) delete, from the storage, from among intermediate-sample subsequence data items corresponding to a learned-sample subsequence data item whose difference degree from the diagnosis target time-series data corresponding to the diagnosis result is smaller than the first threshold value, an intermediate-sample subsequence data item whose difference degree from the diagnosis target time-series data corresponding to the diagnosis result is smaller than the first threshold value and (ii) update the learned-sample subsequence data item stored in the storage based on intermediate-sample subsequence data items remaining after the deletion.

9. The time-series data diagnosis device according to claim 8, further comprising:
a parameter updater to, when the evaluation information acquired by the evaluation information acquirer indicates evaluation that the diagnosis result indicated by the diagnosis result information is not valid, update the parameters based on the updated learned-sample subsequence data item.

10. The time-series data diagnosis device according to claim 1, further comprising:
a parameter updater to, when the evaluation information acquired by the evaluation information acquirer indicates evaluation that the diagnosis result indicated by the diagnosis result information is not valid, update the parameters based on the updated learned-sample subsequence data item.

11. An additional learning method performed by a time-series data diagnosis device, comprising:
calculating a difference degree between diagnosis target time-series data and a learned-sample subsequence data item generated based on intermediate-sample subsequence data items that each are generated from a statistical value of subsequence data items included in a corresponding group of groups into which learning target time-series data is grouped, the subsequence data items included in each group being temporarily sequential and similar to each other;
generating, by comparing the difference degree and a first threshold value, diagnosis result information about the diagnosis target time-series data;
acquiring evaluation information indicating evaluation as to whether a diagnosis result indicated by the diagnosis result information is valid;
generating, when the difference degree is larger than or equal to the first threshold value and the acquired evaluation information indicates evaluation that the diagnosis result is not valid, update-intermediate-sample subsequence data items from statistical values of subsequence data items included in a corresponding group of groups into which the diagnosis target time-series data corresponding to the diagnosis result information evaluated as indicating a non-valid diagnosis result is grouped, the subsequence data items included in each group being temporarily sequential and similar to each other;
generating sample subsequence data items based on (i) the update-intermediate-sample subsequence data items and (ii) the intermediate-sample subsequence data items; and
updating, using the generated sample subsequence data items, the learned-sample subsequence data item.

12. A recording medium storing a program causing a computer to execute:
a difference-degree calculation step of calculating a difference degree between diagnosis target time-series data and a learned-sample subsequence data item generated based on intermediate-sample subsequence data items that each are generated from a statistical value of subsequence data items included in a corresponding group of groups into which learning target time-series data is grouped, the subsequence data items included in each group being temporarily sequential and similar to each other;
a diagnosis-result-information generating step of generating, by comparing the difference degree calculated in the difference-degree calculation step and a first threshold value, diagnosis result information about the diagnosis target time-series data;
an evaluation information acquiring step of acquiring evaluation information indicating evaluation as to whether a diagnosis result indicated by the diagnosis result information is valid; and
an updating step of, when the difference degree is larger than or equal to the first threshold value and the evaluation information acquired in the evaluation information acquiring step indicates evaluation that the diagnosis result is not valid, (i) generating update-intermediate-sample subsequence data items from statistical values of subsequence data items included in a corresponding group of groups into which the diagnosis target time-series data corresponding to the diagnosis result information evaluated as indicating a non-valid diagnosis result is grouped, the subsequence data items included in each group being temporarily sequential and similar to each other, (ii) generating sample subsequence data items based on the update-intermediate-sample subsequence data items and the intermediate-sample subsequence data items and (iii) updating, using the generated sample subsequence data items, the learned-sample subsequence data item.

\* \* \* \* \*